United States Patent
Moriyasu et al.

(10) Patent No.: US 6,624,895 B1
(45) Date of Patent: Sep. 23, 2003

(54) METHOD AND APPARATUS FOR MEASURING ASPHERICAL SHAPE AND METHOD FOR MANUFACTURING OPTICAL ELEMENT USING THEM

(75) Inventors: Sei Moriyasu, Tokyo (JP); Junichi Kato, Wako (JP); Yutaka Yamagata, Wako (JP); Hitoshi Ohmori, Wako (JP); Shinya Morita, Tokyo (JP)

(73) Assignee: Riken (JP)

( * ) Notice: Subject to any disclaimer, the term of this patent is extended or adjusted under 35 U.S.C. 154(b) by 0 days.

(21) Appl. No.: 09/518,220

(22) Filed: Mar. 3, 2000

(30) Foreign Application Priority Data

Mar. 3, 1999 (JP) .......................................... 11-055867

(51) Int. Cl.⁷ ................................................ G01B 9/07
(52) U.S. Cl. .................................................... 356/513
(58) Field of Search .............................. 356/512, 513, 356/495, 489

(56) References Cited

U.S. PATENT DOCUMENTS 4,697,927 A    10/1987  Ono
5,317,389 A *  5/1994  Hochberg et al. ........... 356/511
5,416,586 A *  5/1995  Tronolone et al. .......... 356/513

FOREIGN PATENT DOCUMENTS

DE        3801889        8/1989

* cited by examiner

Primary Examiner—Samuel A. Turner
Assistant Examiner—Patrick Connolly
(74) Attorney, Agent, or Firm—Griffin & Szipl, P.C.

(57) ABSTRACT

An aspherical reference surface 2 is manufactured with such a shape accuracy that an interference band appears according to the aspherical shape of a surface 1 to be measured, an aspherical wave front 3 is formed using the reference surface, and a large aspherical surface is measured from interference within a short time. The aspherical reference surface is an aspherical surface optical element 10 manufactured by fly-cutting or ELID-grinding, that produces the interference band from light reflected from the aspherical surface and predetermined reference light, and thereby measures the shape of the aspherical surface from interference. The aspherical surface optical element should be an aspherical reflecting mirror with such a shape accuracy that an interference band is generated and parallel light is reflected in the direction normal to the surface to be measured. Thus, the shape can be measured in a short time without using an aspherical surface standard.

5 Claims, 5 Drawing Sheets

METHOD AND APPARATUS FOR MEASURING ASPHERICAL SHAPE AND METHOD FOR MANUFACTURING OPTICAL ELEMENT USING THEM

This application claims priority of Japanese Patent Application No. 55867/1999, filed Mar. 3, 1999, the entire disclosure of which is incorporated herein by reference.

BACKGROUND OF THE INVENTION

1. Technical Field of the Invention

The present invention relates to methods and apparatus for measuring an aspherical shape, and methods for measuring an optical element using the methods and the apparatus.

2. Prior Art

An interferometer is often used to measure the shape of a plane or a sphere because two-dimensional data can be collected within a short time. When a general plane or a sphere is measured using an interferometer, a reference surface standard with infinitively small dimensional errors for the plane or the sphere is required. More explicitly, when measuring the shape of a sphere, spherical surface standards with several radii are prepared, an interference band is formed using reference light from the spherical surface standard and measurement light from a surface under measurement, and the shape of the surface under measurement is determined with respect to the spherical surface standard.

To produce an aspherical optical element such as an aspherical lens and an aspherical reflecting mirror with high precision and high efficiency, the use of the aforementioned interferometer is strongly required for interference of the shape of the aspherical surface. However, when a conventional spherical interference means is applied to an aspherical surface, object surfaces must be very limited, simple shapes such as an aspherical surface with only a slight deviation from a genuine spherical surface or a cylindrical surface; the former is measured using a spherical surface standard and CGH, and the latter using a cylindrical lens and HOE.

In other words, when an aspherical surface is measured with an interferometer using a conventional spherical surface standard, no interference band is produced if the, shape error from a true sphere is more than 10 times the wavelength (for instance, about 10 $\mu$m or more), so an interference band can be observed only over an extremely narrow range, therefore, the entire aspherical surface cannot be measured within a short time.

Conversely, this problem can be solved in principle by manufacturing an aspherical standard with extremely small errors in shape from a surface under measurement, like a spherical shape. However, compared to a spherical surface standard, an aspherical surface standard is very difficult to manufacture. If such a standard can be manufactured, an aspherical surface under measurement can also be machined with a high accuracy. In addition, when the absolute shape of an aspherical surface standard is evaluated under an interference measurement, another aspherical surface standard with a higher accuracy must be used. Moreover, the aspherical surface of an object under measurement for substantially every radius of curvature cannot be measured using spherical surface standards with several radii of curvature, each of which has a spherical surface. Therefore, one aspherical surface standard is required with an aspherical surface.

Consequently, it is essentially impossible to measure an aspherical shape using an interferometer and a aspherical surface standard, except for very limited cases such as when a large lot of identical aspherical surfaces are measured.

SUMMARY OF THE INVENTION

The present invention solves the problems mentioned above. That is, an object of the present invention is to provide methods and apparatus for measuring an aspherical shape within a short time without using an aspherical surface standard and methods for manufacturing optical elements using the aforementioned methods and apparatus.

The present invention provides methods for measuring an aspherical shape, whereby an aspherical reference surface (2) is manufactured with such an accuracy of shape that an interference band is produced according to the aspherical shape of a surface (1) to be measured, thereby an aspherical wave front (3) is formed, and an aspherical surface with a large area is measured using an interferometer within a short time.

According to the above-mentioned methods, the aspherical reference surface (2) is manufactured with such an accuracy of shape that an interference band appears. Therefore, compared to a spherical surface standard or an idealistic aspherical surface standard, machining accuracy can be lower with a greater degree of freedom in selecting a material, so that the aspherical reference surface can be provided easily. The aforementioned accuracy of shape to such a degree that an interference band is seen, means that machining tolerance can be no more than several times as large as the wavelength of light used for the interference measurement (for instance, laser light). Although the accuracy of the shape is inferior to that of the standard, the accuracy of the shape is maintained at such a level that an interference band can be observed. Therefore, a wide range of aspherical surface shape can be measured from interference simultaneously and quickly.

The accuracy of the shape of the above-mentioned aspherical reference surface (2) is measured beforehand, and added to the results of the aforementioned measurement, thus the shape of the surface being measured is determined. The accuracy of a shape such as the aspherical reference surface can be measured highly precisely using another high-accuracy measuring instrument (for instance, needle-contact-type shape measuring apparatus etc.). Therefore, by measuring the shape in advance, a large area of the aspherical shape can be measured using an interferometer, within a short time, by adding the results of the above-mentioned measurement.

The above-mentioned aspherical reference surface (2) is manufactured by fly-cutting or ELID-grinding (electrolytic in-process dressing grinding) . When the aspherical reference surface is a reflecting surface, a high-accuracy mirror surface can be easily manufactured by fly-cutting a metal surface. Even when the aspherical reference surface is a reflecting surface or a transparent surface such as a lens, it can be ground at a high accuracy by ELID-grinding.

In addition, the present invention provides an apparatus for measuring the shape of an aspherical surface with an aspherical surface optical element (10) having an aspherical reference surface (2) that matches the aspherical surface shape of surface (1) under measurement, thereby an interference band is formed by light reflected from the aspherical surface of an aspherical wave front (3) produced by the aforementioned aspherical reference surface and predetermined reference light, and the shape of the aspherical surface is interference measured.

According to this configuration, an aspherical wave front (3) is formed by the aspherical optical element (10) with the aspherical reference surface (2), and by achieving the interference band using light reflected from the aspherical surface and the predetermined reference light, the shape of the aspherical surface can be measured using an interferometer.

The above-mentioned aspherical optical element (10). is an aspherical reflecting mirror whose shape accuracy is such that the interference band appears, and parallel light is reflected in the normal direction of the surface under measurement. In this configuration, the aspherical reflecting mirror is manufactured with such a shape accuracy that an interference band appears, parallel light is reflected in the normal direction of the surface under measurement, the interference band is formed by reflected light and predetermined reference light, thereby the shape of the aspherical surface can be measured using an interferometer. In addition, an aspherical surface light element can be provided easily, because such shape accuracy as that producing the interference band is lower than those of a spherical surface standard or an ideal aspherical surface standard, and the material of the reflecting mirror can be chosen from among a wide range of materials.

Furthermore, according to the present invention, a plurality of aspherical reference surfaces (2) are manufactured using the aforementioned methods or apparatus, thus a plurality of aspherical wave fronts (3) are formed, and a wide aspherical area is interference measured within a short period. Using these methods, particularly when the surface (1) under measurement is large, the aspherical reference surface (2) required can be made compact while maintaining its accuracy sufficiently high, as well as measuring the large surface under measurement simultaneously and quickly, using an interferometer.

Other objects and advantages of the present invention are revealed by the following explanations referring to the attached drawings.

DESCRIPTION OF PREFERRED EMBODIMENTS

Figure 1A:
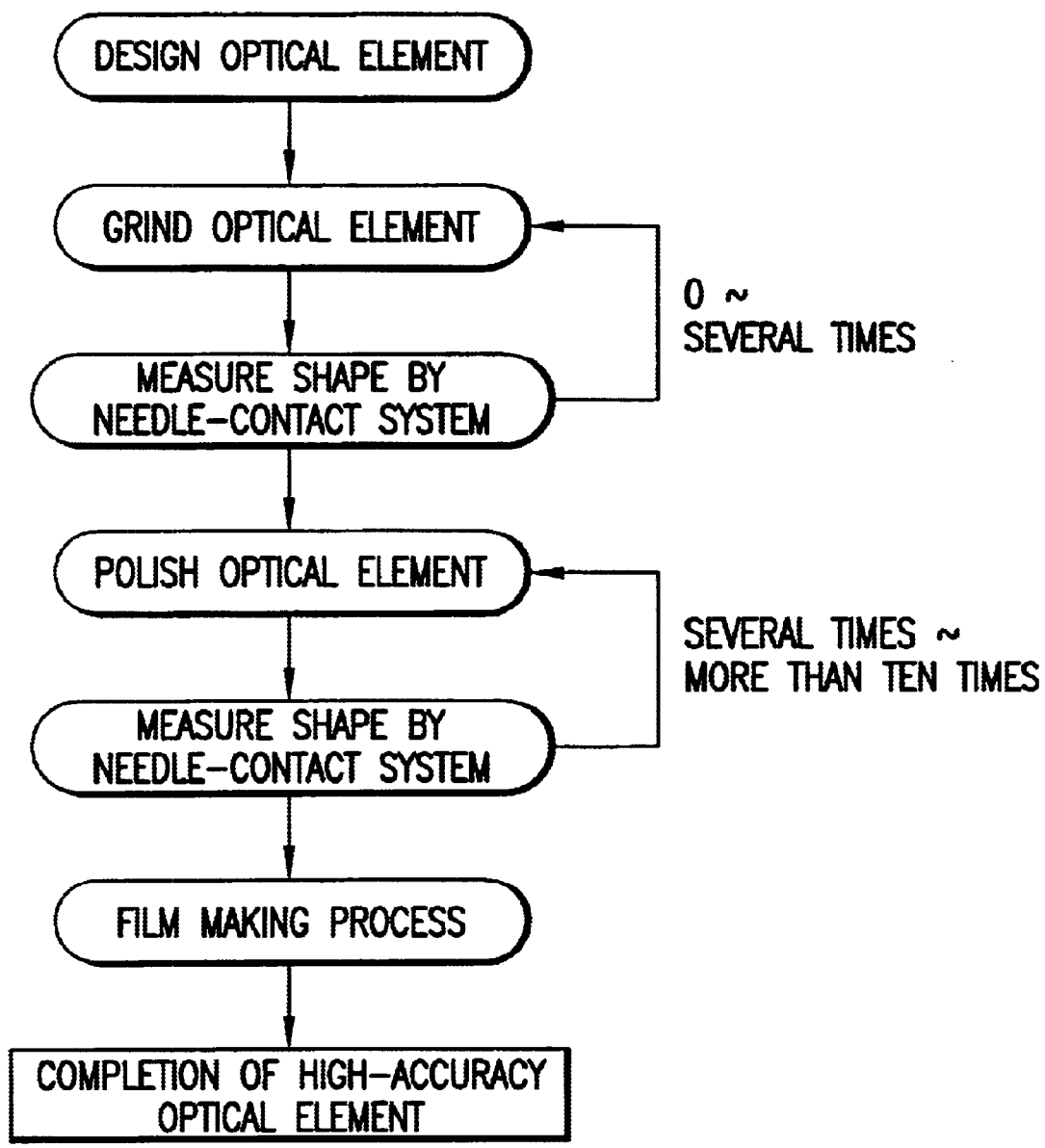
FIGS. 1A and 1B are block diagrams showing differences between conventional methods (A) for manufacturing an aspherical optical element and methods (B) according to the present invention.

Preferred embodiments of the present invention are described below referring to the drawings. Portions in common with the drawings are numbered identically, and no duplicate description is given below.

1. Classification of Shape Measuring Methods

Methods for measuring an aspherical shape are classified generally into contact-needle type, optical contact-needle type, and interference type. In the contact-needle type, there is contact with an object being measured, so the degree of freedom for measurable shapes becomes considerably high, and even a fairly steep shape can be measured. However, when measuring pressure is high, the object under measurement can be flawed or measurement error may increase problematically. The optical contact-needle type allows non-contact measurements of an object, therefore, the object is never flawed. But when the surface of the object under measurement is a mirror surface with a steep slope, measurement is difficult. Consequently, both types are suitable for measuring a geometrical position at a certain spot. However, when measuring a surface with a shape, the measuring time becomes considerably long because two-dimensional scanning is required.

With the interference type, conversely, although measurable shapes are limited only to rather simple shapes such as a flat plane or a spherical surface at present, as described above, measuring time is much faster because a plane can be measured. Therefore, interference measurements of an aspherical shape might be demanded when the distribution of formed errors in an aspherical shape must be evaluated quickly.

2. Concept of Aspherical Surface Interference Measurement Methods Using Aspherical Reference Surface Generally, when a planar or spherical surface is measured using an interferometer, a planar or spherical reference surface which is as close to the design shape of the standard as possible with extremely small errors in shape is considered to be preferable, and the absolute shape of this standard is evaluated using another standard with good traceability and high accuracy. In addition, various spherical standards with several radii of curvature are prepared, whereby spherical objects with a variety of curvature radii can be measured.

However, when an aspherical surface is interference measured, it is very difficult to manufacture an aspherical surface standard that is infinitely close to the design shape of an object with extremely small errors in shape. If it is possible, an aspherical surface object under measurement might have been manufactured with a high accuracy. With the absolute shape of the aspherical surface standard, interference measurement also cannot be used because another aspherical surface standard with a higher accuracy is needed. Moreover, unlike when evaluating a spherical surface in which a limited number of spherical surface standards with several radii of curvature would be sufficient to measure the spherical surface of a measurement object with substantially all radii of curvature, one aspherical surface standard is required for each aspherical surface shape, as a general rule.

A general concept proposed in the present invention for measuring an aspherical surface under interference using an aspherical reference surface, which is significantly different from a conventional interference measurement of a plane or a spherical surface. That is first that the aspherical reference surface is not intended to be infinitely close to a shape targeted with extremely small errors in shape, unlike the aforementioned high-accuracy aspherical surface standard, but instead, is provided with an aspherical surface shape with such a degree of error that only an interference band appears. In other words, shape accuracy is satisfactory provided the accuracy is within several times the wavelength.

More explicitly, the methods of the present invention are shown typically in FIG. 2. According to the aspherical shape of surface 1 under measurement, aspherical reference surface 2 with such a shape accuracy that the interference band produced is that required, thereby an aspherical wave front 3 is given to rise, thus a large area is measured by aspherical interference within a short time. Because the aspherical reference surface 2 is manufactured with a shape accuracy that produces an interference band according to the methods of the invention with a lower machining accuracy and a greater degree of freedom in selecting the material than using a spherical surface standard or an ideal aspherical surface standard, the aspherical reference surface can be prepared more easily. In addition, since the aspherical reference surface is provided with such a degree of shape accuracy that the interference band appears although the accuracy is inferior to that of the standard, a wide area of the aspherical surface shape can be measured by interference simultaneously within a short period.

Also, the shape of the aspherical reference surface is evaluated highly accurately using another highly accurate measuring instrument. The shape of this measuring instrument cannot be easily evaluated by the interference measurement described above; therefore, another measuring method such as a contact-needle type is used. With an aspherical surface, one aspherical reference surface is designed and manufactured generally for each shape of one aspherical surface, which is different from the case using spherical surface standards. According to the methods of the present invention, the above-mentioned aspherical reference surface is used to convert a light wave-front into an aspherical surface and makes light reflected from an aspherical surface under measurement with other light reflected from a planer reference surface in an interferometer, and the aspherical surface is measured by interference, in principle. To this end, the shape of the aspherical reference surface has such a shape accuracy that an interference band appears, and the shape thereof has been measured and evaluated with high accuracy as a precondition, from which the shape of the surface under measurement is ascertained.

Therefore, according to the methods of the present invention, the shape accuracy of aspherical reference surface 2 is measured beforehand, and the shape of the surface under measurement is measured by adding measured accuracies to the result of the aforementioned measurement. Accordingly, a wide area of the shape of the aspherical surface can be interference measured quickly by modifying the above-mentioned measurement results by the shape accuracy.

3. Features of the Present Invention in the Methods for Manufacturing an Aspherical Surface Optical Element FIGS. 1A and 1B compare conventional methods (A) for manufacturing an aspherical optical element and methods (B) according to the present invention for manufacturing an aspherical optical element using an aspherical reference surface and aspherical surface interference measurement methods.

Figure 1B:
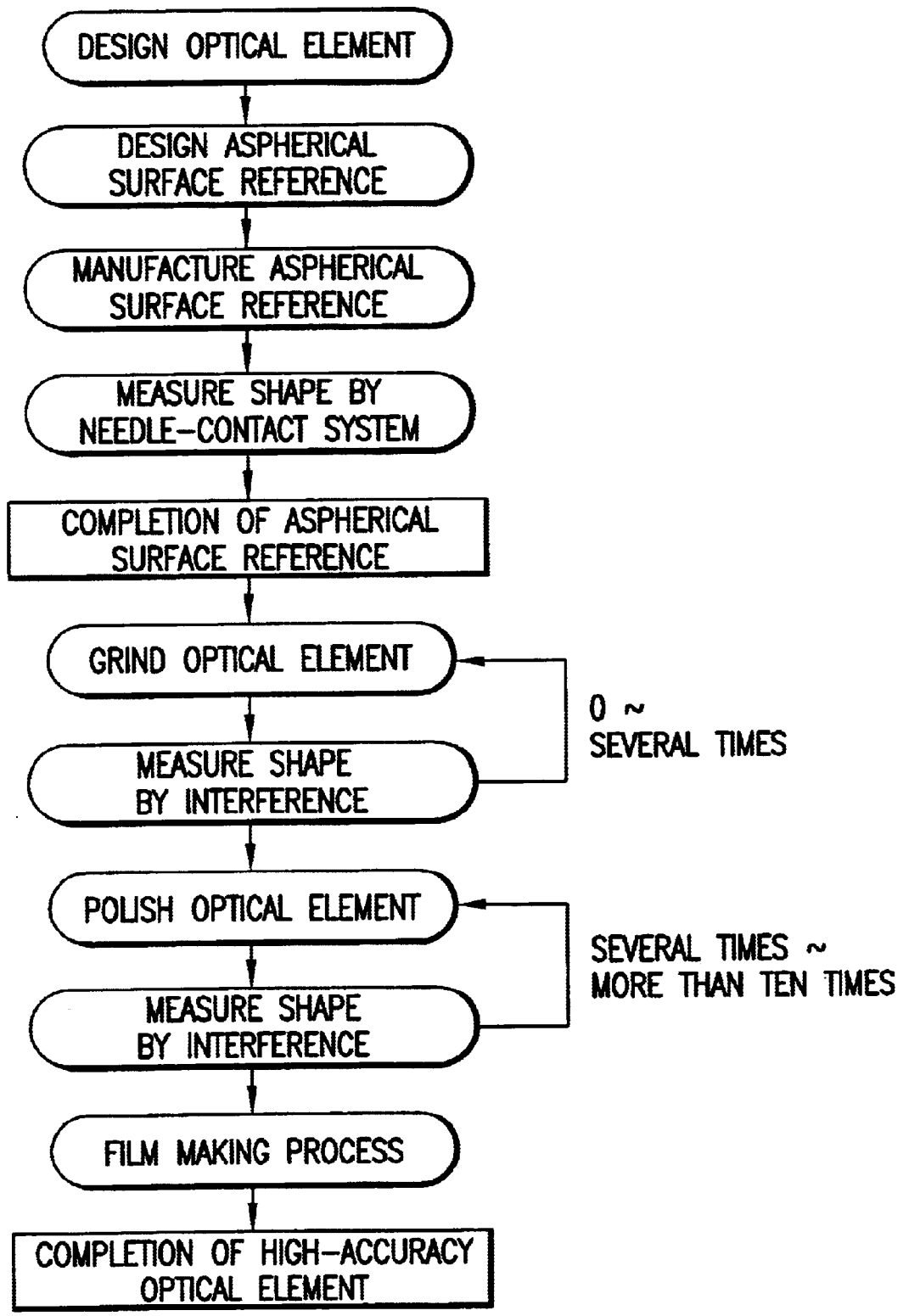

According to the conventional methods in FIG. 1A, the shape of a surface under measurement is measured using a contact-needle system after grinding and polishing. However, according to the methods of the present invention, the shape is measured from interference. Another point of difference is that according to the present invention, aspherical reference surface 2 is manufactured beforehand.

In both methods, therefore, the shape of an optical element is determined through an optical design process. After that, a material is roughly machined into an outlined shape. Normally, an optical material is selected from among hard materials such as glass and ceramic. Consequently, a selected material is often ground into the outlined shape. At this time, the shape is corrected through a supplementary processing, preferably to a shape accuracy of a sub-micron level, thereby the cutting allowance in a subsequent polishing can be reduced, resulting in a reduction of total machining time. This supplementary processing is normally performed twice or three times. In practice, the surface is polished after the above process to reduce roughness.

However, if an extremely high shape accuracy is demanded, similar shape correction is required also in polishing. For the case of a mirror for X-rays, this supplementary processing is normally repeated more than ten times. Every time supplementary processing is finished, the shape of the work is measured, and shape errors must be determined. Since an aspherical optical element has a large aspherical surface area, a considerably long time is taken to measure the shape. As a consequence, the time required for measurement shares a considerable proportion of the total time for manufacturing the optical element, as well as the time for machining, therefore, reducing the time for measurement contributes to shortening the total time for manufacturing the optical element and reducing total cost. Likewise, measuring time occupies a large portion of the time for a total process when a large optical element is manufactured or a large number of optical elements of the same shape are produced, consequently, measuring time must be reduced as an important theme.

According to the methods of the present invention, in addition, a plurality of aspherical reference surfaces 2 are manufactured thereby a plurality of aspherical wave fronts are produced, and a large area is measured by aspherical surface interference in a short time. When surface 1 under measurement is large, in particular, aspherical reference surfaces 2 required can be made compact and accuracies thereof can be maintained high, together with performing interference measurements for large surfaces under measurement simultaneously in a short time.

An interference measurement is more advantageous than a contact-needle method etc. in terms of processing time. Because a real measurements are taken compared to point measurements of the latter, so when a short measuring time is desired, interference measurement is effective. However, in aspherical surface interference measurement methods using aspherical reference surfaces, proposed in the present invention, aspherical surface optical elements must be manufactured as other aspherical reference surfaces in addition to an aspherical surface optical element intended originally for manufacture. Under these circumstances, whether or not the methods of the invention are used should be judged by comparing the time spent for manufacturing aspherical reference surfaces and the reduction of measuring time through the entire process. When processing an aspherical reference surface, the shape accuracy required is not as high as the accuracy of an aspherical optical element originally planned for manufacture. Furthermore, the material thereof is not limited specifically, so the manufacturer can select a material with good machineability, resulting in a considerably shorter time for machining than in manufacturing a preferred aspherical optical element. Consequently, as described above, the methods of the present invention become more advantageous when manufacturing a high-accuracy optical element, a large optical element, or a large lot of optical elements.

Figure 2A:
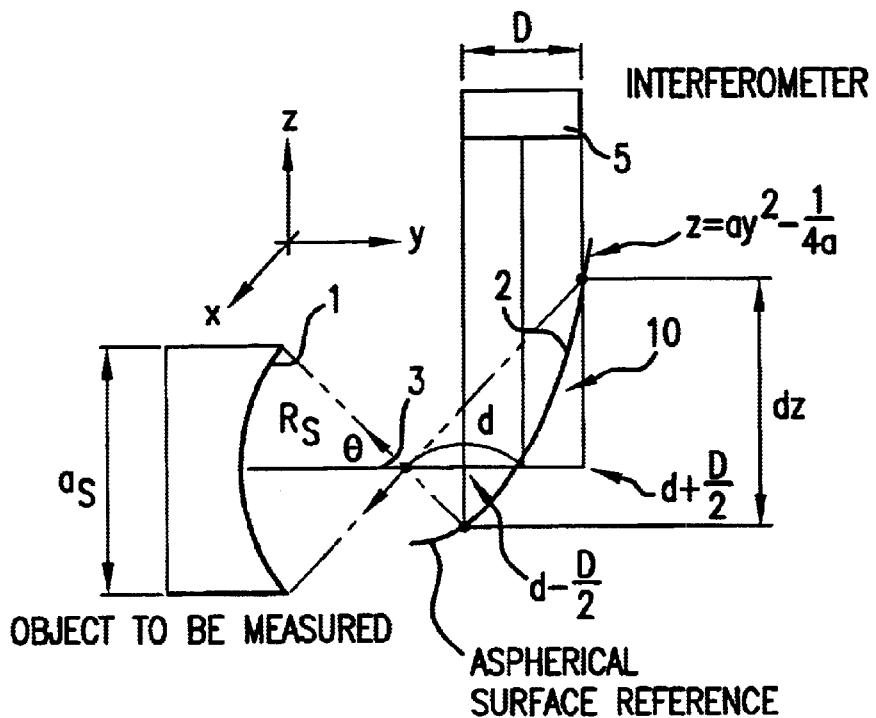
FIGS. 2A and 2B show principles of the aspherical reference surface according to the present invention.
Figure 2B:
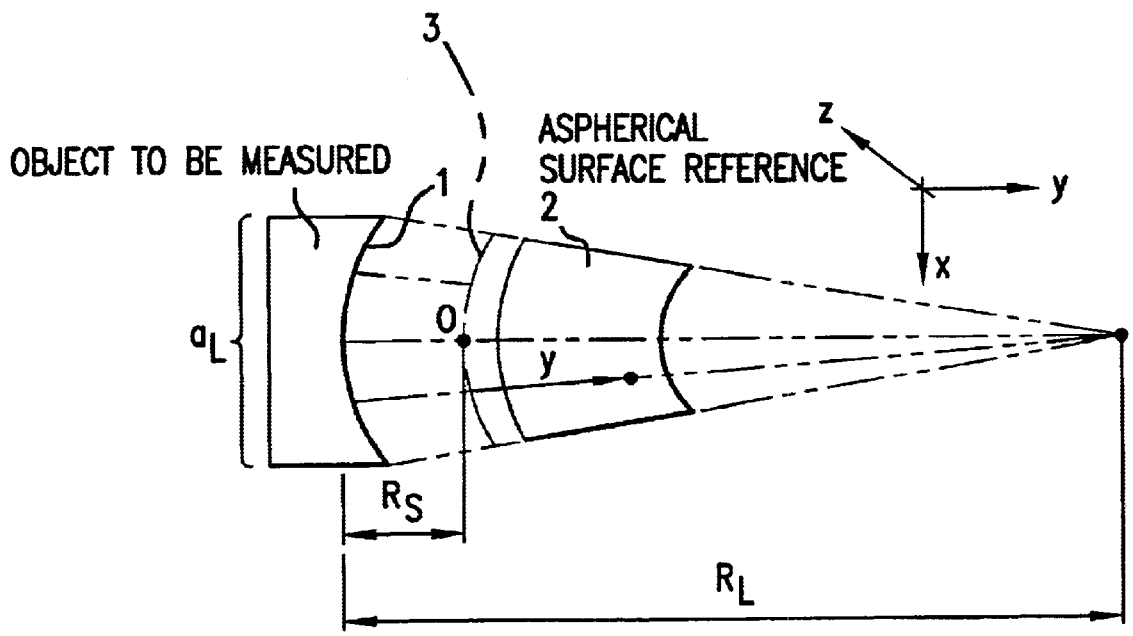

The measuring apparatus of the present invention, schematically shown in FIGS. 2A and 2B. That is provided with an aspherical surface optical element 10 with an aspherical reference surface 2 that matches the shape of the aspherical shape of surface 1 under measurement. This aspherical surface optical element 10 is an aspherical surface reflecting mirror with a shape accuracy that produces an interference band, and that reflects parallel light in the normal direction of the surface under measurement with a shape accuracy such that an interference band can be observed. In these figures, numeral 5 represents an interferometer that radiates parallel light towards aspherical optical element 10, and measures interference by the light reflected from the element.

Using this configuration, the aspherical reflecting mirror 10 can be manufactured with a shape accuracy that is capable of giving rise to an interference band, parallel light is reflected in the direction normal to surface 1 under measurement to produce aspherical wave front 3, the interference band is formed by light reflected from surface 1 under measurement and predetermined reference light, and the aspherical surface shape can be measured by interference. The shape accuracy, such as producing the interference band, is lower than that of a spherical surface standard or idealistic aspherical surface standard, and the reflecting mirror can easily provide an aspherical surface optical element because of the large degree of freedom for selecting a material.

[Preferred Embodiments]

Figure 3:
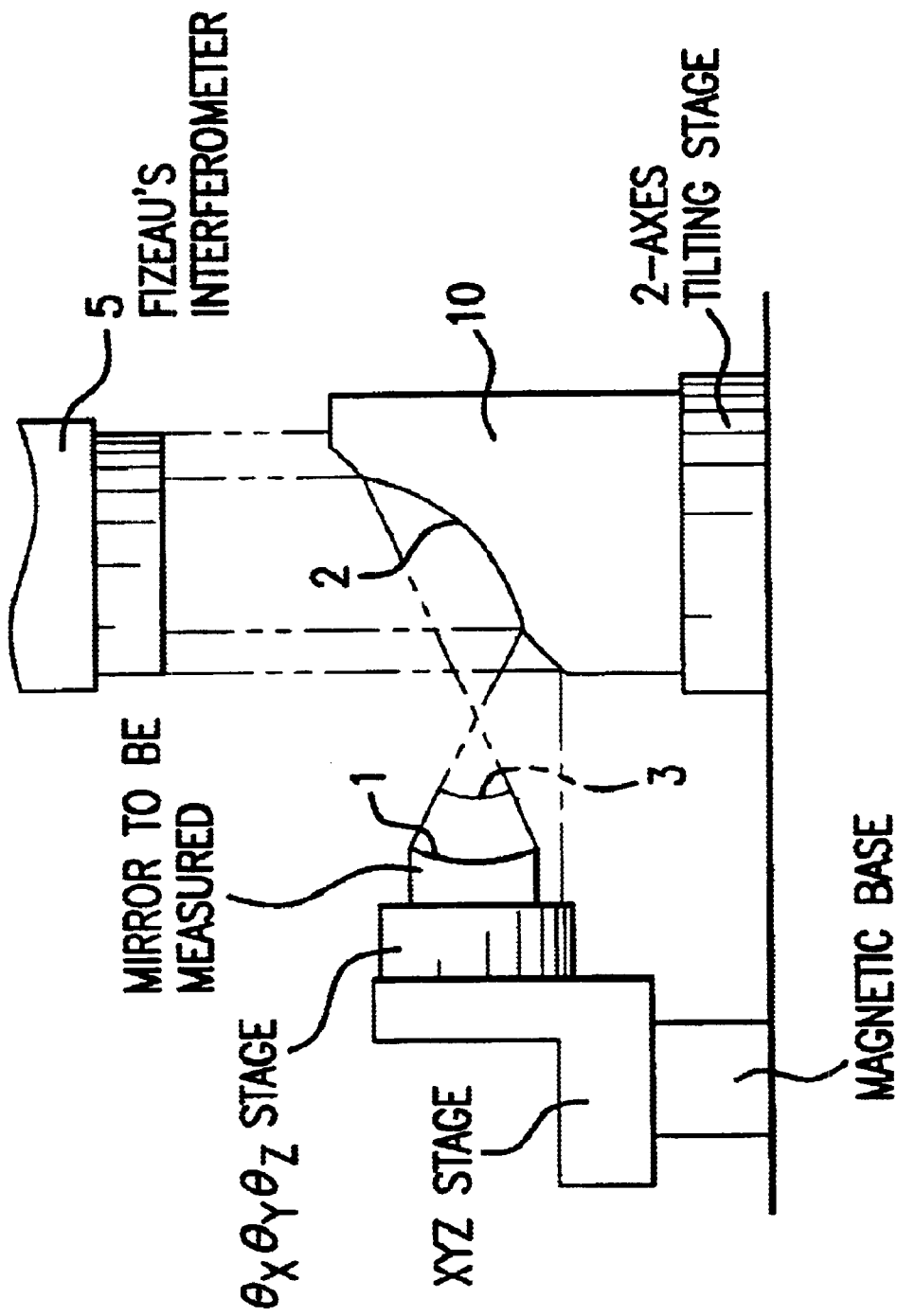
FIG. 3 shows the configuration of an embodiment of a measuring apparatus according to the present invention.

4. Experiment Measuring Aspherical Surface by Interference Using Aspherical Reference Surface An axially asymmetrical, aspherical troidal surface was selected as the shape to be measured, and correspondingly, the shape of an aspherical reference surface was designed. Radii of curvature on the troidal surface were selected at $R_s$=37.36 mm and $R_L$=6,799 mm, forming an undulating surface. As shown in FIGS. 2A and 2B, the shape of the aspherical reference surface was designed so that in the Rs direction, parallel light from an interferometer was focused once, and in the $R_L$ direction, parallel light diverged, thereby light was sent vertically to any point on the troidal surface. That is, the shape of the aspherical reference surface was machined into an axially offset, parabolic surface. Because the aspherical reference surface was required to be manufactured in a labor-saved manner as far as possible, oxygen-free copper was selected and finished to an aspherical shape by fly-cutting. This method was known in the prior art as a method whereby an aspherical shape could be fly-cut with a shape accuracy of about 0.1 $\mu$m. The aspherical reference surface manufactured in the aforementioned way was installed under a Fizeau's interferometer 5 shown in FIG. 3, and the object of measurement was installed in the proximity thereof on the side. A horizontal surface and a 45° angled surface were machined at the same time on the aspherical reference surface. According to which as a reference surface, relative position and attitude between the reference surface and the object under measurement were adjusted.

Figure 4:
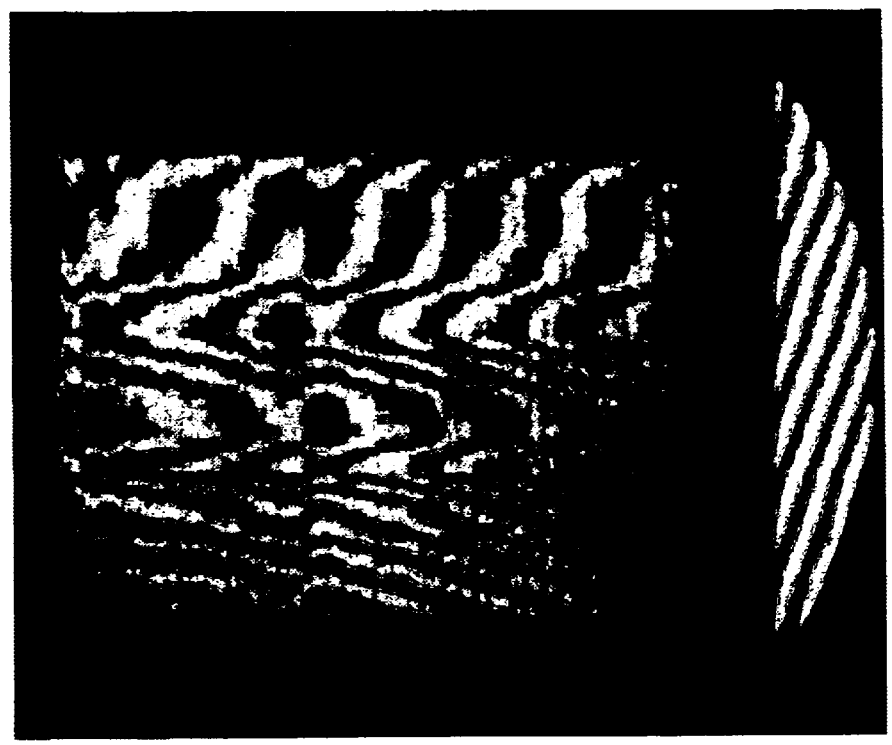
FIG. 4 is a gray-scale picture, displaying an interference band related to the embodiment of the present invention.
Figure 5:
FIG. 5 is a picture in an intermediate tone, of the result of a shape analysis from the interference band in FIG. 4.

An interference band when the troidal shape was measured by interference using the aspherical reference surface in the above-mentioned way is shown in FIG. 4. The result of the shape analysis using this interference band is shown in FIG. 5. The interference band could be observed substantially throughout the surface of the measurement object shown in FIGS. 4 and 5. Therefore it was confirmed that the large surface under measurement could be measured by interference simultaneously within a short time.

5. Summary

According to the present invention, novel methods for measuring the shape of a general aspherical surface using an interferometer and an aspherical reference surface are proposed. As a surface to be measured, an axially offset revolving parabolic, aspherical reference surface was manufactured by fly-cutting with respect to a troidal shape. Then it was measured by interference using a Fizeau's interferometer, and an interference band was measured over the entire surface of the work under measurement.

As described above, the methods and the apparatus for measuring an aspherical surface shape and the process for manufacturing an optical element using the methods and the apparatus can provide excellent advantages, whereby the shape can be measured quickly without using an aspherical surface standard.

Although the present invention has been explained referring to several preferred embodiments, the scope of rights covered by the invention should not be understood to be limited only to these embodiments. Conversely, the scope of rights for the invention includes all amendments, modifications, and all other similar subjects provided they are included in the scope of the attached claims.

What is claimed is:

1. A method for measuring the shape of an aspherical surface, comprising the steps of:

providing an aspherical surface to be measured;

manufacturing an aspherical reference surface with a shape accuracy of such a degree that the aspherical reference surface is capable of producing an interference band according to the aspherical shape of the aspherical surface to be measured;

producing an aspherical wave front by reflecting light using the aspherical reference surface and generating the interference band; and measuring by interference, within a predetermined time and using the interference band, an aspherical area of the aspherical surface to be measured.

2. The method for measuring the shape of an aspherical surface, specified in claim 1, further comprising the steps of:

measuring the shape accuracy of the aspherical reference surface beforehand; and adding the measured accuracy thereof to the measured result for said large aspherical area, thereby determining the shape of said aspherical surface to be measured.

3. The method for measuring the shape of an aspherical surface, specified in claim 1, wherein said aspherical reference surface is manufactured by fly-cutting or ELID-grinding.

4. An apparatus for measuring, using interference, the shape of an aspherical surface, comprising:

an aspherical surface optical element with an aspherical reference surface matching the aspherical surface of a surface to be measured; and an interferometer disposed to measure light reflected by the aspherical reference surface, wherein the aspherical reference surface forms an interference band using light reflected from the aspherical reference surface to provide an aspherical wave front, wherein the aspherical wave front and predetermined reference light are measured by the interferometer so that the shape of the aspherical surface to be measured is measured by interference.

5. An apparatus for measuring, using interference, the shape of an aspherical surface, comprising:

an aspherical surface optical element with an aspherical reference surface matching the aspherical surface of a surface to be measured, wherein the aspherical surface optical element comprises an aspherical reflecting mirror with a shape accuracy that is capable of forming an interference band, with the mirror reflecting parallel light in the direction normal to the surface to be measured; and an interferometer disposed to measure light reflected by the aspherical reference surface, wherein the aspherical reference surface forms an interference band using light reflected from the aspherical reference surface to provide an aspherical wave front, wherein the aspherical wave front and predetermined reference light is measured by the interferometer so that the shape of the aspherical surface to be measured is measured by interference.

* * * * *